United States Patent [19]
Franke et al.

[11] Patent Number: 5,512,090
[45] Date of Patent: Apr. 30, 1996

[54] COMPOSITIONS FOR RESILIENT BIODEGRADABLE PACKAGING MATERIAL PRODUCTS

[75] Inventors: Hans G. Franke, Tiburon, Calif.; Donald R. Bittner, Irving, Tex.

[73] Assignee: Free-Flow Packaging Corporation, Redwood City, Calif.

[21] Appl. No.: 304,365

[22] Filed: Sep. 12, 1994

Related U.S. Application Data

[63] Continuation-in-part of Ser. No. 82,273, Jun. 24, 1993, abandoned.
[51] Int. Cl.⁶ ............................ C08L 3/02; C09D 103/02
[52] U.S. Cl. ..................... 106/154.1; 106/211; 106/213
[58] Field of Search ................................ 106/154.1, 211, 106/213

[56] References Cited

U.S. PATENT DOCUMENTS

| | | | |
|---|---|---|---|
| 4,076,846 | 2/1978 | Nakatsuka et al. | 426/62 |
| 4,863,655 | 9/1989 | Lacourse et al. | 264/53 |
| 5,035,930 | 7/1991 | Lacourse et al. | 428/35.6 |
| 5,043,196 | 8/1991 | Lacourse et al. | 428/35.6 |
| 5,153,037 | 10/1992 | Alteri | 428/35.6 |
| 5,208,267 | 5/1993 | Neumann et al. | 521/79 |
| 5,279,658 | 1/1994 | Aung | 106/154.1 |

*Primary Examiner*—David Brunsman
*Attorney, Agent, or Firm*—Flehr, Hohbach, Test, Albritton & Herbert

[57] ABSTRACT

A resilient, low density, biodegradable, packaging material which is formed by the extrusion through a twin-screw extruder of a base mixture of vegetable oil, polyvinyl alcohol, glycerine, a proteinaceous grain meal, glycerol monostearate, a non-modified starch and water.

8 Claims, No Drawings

COMPOSITIONS FOR RESILIENT BIODEGRADABLE PACKAGING MATERIAL PRODUCTS

CROSS-REFERENCE TO RELATED APPLICATION

This application is a continuation-in-part of U.S. patent application Ser. No. 08/082,273 filed Jun. 24, 1993, entitled "Compositions for Resilient Biodegradable Packaging Material Products", now abandoned.

FIELD OF THE INVENTION

The present invention relates generally to improved compositions for preparing resilient, expanded, biodegradable starch containing products appropriate for use as packaging material.

BACKGROUND OF THE INVENTION

Until fairly recently, packaging materials, such as loose fill, consisted mainly of polystyrene also known as "Styrofoam". However, the use of such non-biodegradable plastic materials poses a serious threat to the environment. Therefore, manufacturers have recently begun to make packaging materials from expanded starch products. For example, U.S. Pat. Nos. 4,863,655; 5,035,930 and 5,043,196 disclose compositions and methods for making an expanded starch material having an at least 45% by weight amylose content. The starches in these compositions have been modified by etherification with alkylene oxides. One of these compositions comprising starch which has been hydroxypropylated with propylene oxide is made by National Starch, Bridgewater, N.J., and sold on the market as ECO-FOAM™. It is, however, quite expensive and the other existing products are either also expensive or too brittle or too heavy to be truly practical for packaging material.

Therefore, an inexpensive, biodegradable, highly resilient packaging material would be extremely desirable in commerce.

SUMMARY OF THE INVENTION

The present invention provides improved compositions for use in resilient, biodegradable, packaging material. The present invention also provides for the One aspect, therefore, of the present invention is to provide a new and improved resilient composition for use with an extrusion apparatus to produce a loose fill packaging material.

A second aspect of the invention is to provide a base mixture for use in producing a packaging material product which comprises the following first six ingredients plus added water expressed in % by weight of the first six ingredients: vegetable oil: about 0.5% to about 5%, polyvinyl alcohol: about 5% to about 25%, glycerine: about 0.5% to about 10%, proteinaceous grain meal: about 3% to about 10%, glycerol monostearate: about 0.1% to about 0.8%, non-modified starch: about 45% to about 90%, and added water: about 0% to about 30%.

A third aspect of the invention is to provide a base mixture for use in producing a packaging material product which comprises the following six ingredients expressed in % by weight of the six ingredients: a vegetable oil content of about 0.9%, a polyvinyl alcohol content of about 18.7%, a glycerine content of about 0.9%, a grain meal content of about 4.7%, a glycerol monostearate content of about 0.2%, a non-modified starch content of about 74.6%. To complete the mixture, water is preferably added in the amount of about 4% to about 9% by total weight of the other ingredients.

A further aspect of the invention is a biodegradable packaging material product which comprises an expanded composition of vegetable oil, polyvinyl alcohol, glycerine, a proteinaceous substance, glycerol monostearate and non-derivatized starch. The product has a moisture content of from about 4% to about 15%, preferably from about 7.0% to about 13.0% by weight of the product, a creep of about 10% to about 18%, preferably about 15% to about 18%, a set of about 6% to about 16%, preferably about 8% to about 10% and a bulk density of from about 0.3 to about 2.0 lb/ft$^3$.

Additional aspects will appear in the following description of the invention.

DETAILED DESCRIPTION OF THE INVENTION

This invention is directed to an expanded, biodegradable, resilient packaging material that is made from starch and other ingredients. The packaging material can be used as loose fill to cushion fragile items during shipping. The invention is also directed to compositions for making the material and to the end product compositions.

The packaging material can have numerous shapes. The preferred loose fill shape is that of a solid FIG. 8, however, other shapes, such as the shape of a short rod, a tube, an S, an open biloop or triloop or a curlicue, are also appropriate. The starting or base mixtures all utilize a non-modified starch. A non-modified starch is essentially starch as it occurs in nature other than having been physically separated from the other components in the plant of origin, and having acquired the configuration of a coarse or fine powder. A non-modified starch therefore is also a non-derivatized starch. A derivatized starch is one that has been chemically reacted at the hydroxy groups (e.g., etherified, esterified or phosphorylated). Cornstarch is the preferred starch for use in this invention, however, starch from potatoes, wheat, tapioca, rice or the like may also be used. The raw starch can contain anywhere from about 19% to 70% amylose, more preferably 44% amylose or less. Unless stated otherwise, % (percent) as used herein is defined as % by weight. The starch used in the research performed during the course of developing this invention usually had about 22% amylose. The raw starch used in the course of the invention usually has a moisture content of about 8% to about 15% by weight of the starch, preferably about 10% to about 13% but starches with moisture contents of about 4% to about 20% may also be used. The final moisture content of the pre-extruded mixture is from about 8% to about 18% by weight of the mixture, preferably from about 8% to about 12%.

The end product of the invention is made by preparing an initial feed material which is mixed and fed through an extruder and a die at the end of the extruder to exit as an expanded product. Usually this product is periodically cut into small individual units by a cutter assembly positioned in front of the die.

The feed material comprises the following ingredients expressed in % by weight of the first six listed ingredients of the mixture: vegetable oil: about 0.5% to about 5.0%, more preferably about 0.5% to about 3.0%; polyvinyl alcohol: about 5.0% to about 25.0%, more preferably about 6 to about 20.0%; glycerine: about 0.0% to about 10.0%, more preferably 0.5% to about 3.0%; proteinaceous grain meal:

about 3% to about 10.0%, more preferably about 3.0% to about 7.0%; glycerol monostearate: about 0.0% to about 0.8%, more preferably about 0.1% to about 0.5%; non-modified starch: about 45% to about 90%, more preferably about 55% to about 0%; and added water: about 0% to about 30%, more preferably about 5% to about 15%, depending upon the moisture content of the other ingredients.

Any type of vegetable oil such as corn oil, coconut oil, soy oil and the like may be used. Soybean oil, corn oil and rape seed oil were all used to make an extrudate during the development of the invention. The addition of vegetable oil appears to make the product more resistant to dusting (i.e., particle disintegration) and chipping. The preferred proteinaceous meal is white corn meal but other meals such as soy meals and yellow corn meal may also be used. The proteinaceous grain meal acts as a nucleating agent and is believed to aid in the foaming of the final product by providing a superior finely solid phase making it easier for bubbles to form. The proteinaceous grain meal may also control the cell (i.e., gas cavity) size of the foamed product and make the cell sizes more uniform. An acceptable product may also be made without glycerine and/or glycerol monostearate.

The most preferred base mixture formulation which was used to prepare the product comprised 0.9% soy oil, 18.7% polyvinyl alcohol, 0.9% glycerine, 4.7% white cornmeal, 0.2% glycerol monostearate, and 74.6% corn starch. To complete the formulation, water was added at an amount of about 6% to about 9% of the total weight of the other ingredients depending on the moisture content of the raw starch and other ingredients. The lower the feed moisture content the greater the amount of water added and conversely. A preferred moisture content for the base mixture is from about 8% to about 12% by weight of the total mixture.

For all mixtures, the ingredients may be mixed together in any sequence and they may be mixed prior to being fed into the extruder. The mixing can also take place in a mixing chamber attached to the extruder or it can be done in an apparatus separate and apart from the extruder. However, preferably the formulations were mixed in the twin screw extruder used to prepare the product. As the mixture was processed in the extruder, it was transformed into a plasticated mass which was forced through an expanding die.

Following mixing and plasticating, the mixture is extruded through the front of the extruder and out the die at a pressure of about 700 to 2000 psi and a temperature of about 120° C. to about 200° C. A pressure drop which occurs outside the extruder and steam resulting from the heat causes the mixture to expand (i.e., puff up) as it exits the die. The extruder includes feed screws, single lead screws, anywhere from about 3–10 shear paddles and from about 1–5 mixing paddles, and at least one die insert. A typical expanding type screw configuration can be used in the twin-screw extruder. The time the base ingredients, including the added water, spend in the extruder can be from about 9 to about 60 seconds and the extrusion occurs at a rate from about 100 to about 200 lbs/hr per die insert. All of the test mixtures were extruded through a Wenger twin-screw extruder, either Model TX52 or Model TX80, obtained from Wenger Manufacturing, Inc., Sabetha, Kans. The plasticated mass for the preferred formulation was extruded at a pressure of 1000 psig and a temperature of about 175° C. The extruder was adapted with feed screws, single lead screws, 5 shear paddles, 10 mixing paddles and one die insert formed to produce a solid FIG. 8 loose fill shape upon extrusion. The size and configuration of the die opening determines the shape, width and height of the extrudate. The residence time for each tested mixture inside the extruder was about 13 seconds and the mixture was extruded at the rate of 150 lbs/hr per die insert.

Following extrusion, the extrudate, which is an expanded product, was cured in the air at controlled conditions for anywhere from about 8 hours to about 48 hours, preferably from about 12 hours to about 24 hours. Controlled conditions are defined as conditions where the temperature is from about 18° C. to about 30° C., preferably about 21° C., and the humidity is from about 40% to about 80%, preferably about 50%. In preferred practice, the extrudates were cured at 21° C. and a 50% humidity for 24 hours. Because of the production of steam during extrusion and evaporation during the curing process, the end product contains less moisture than the initial mixture (i.e., the feed material). The expanded products had moisture contents ranging from about 5% to about 12% of the weight of the product, with a usual moisture content of from about 7.0% to about 12.0%. The solid FIG. 8 loose fill expanded products resulting from the extrudates all had bulk densities of from 0.3 to 2.0 lb/ft$^3$. The bulk density of the material was determined by filling a cubic foot volume with expanded product and then weighing the resulting amount of the product.

The FIG. 8 loose fill resulting from the cured extrudates of the mixtures attained a creep and set range of about 10% to 18% and about 8% to 15% respectively. Creep and set for loose fill bulk cushioning materials are defined in Federal Specification PPP-C-1683A. Creep represents the time dependent compressive deflection under load expressed as a percent of the original height. Set represents the permanent deflection after the load is removed. The values obtained were tested in accordance with PPP-C-1683A with the exception that the load was 0.40 psi and the time under load was 5 minutes, for both creep and set. The loose fill products resulting from the most preferred formulation had creep and set values of about 10% to about 17% and about 8% to 16% respectively. The bulk densities attained were 0.3 to 0.8 lbs/ft$^3$, mainly from about 0.5 to about 0.65 lbs/ft$^3$.

The invention now being generally described the same will be better understood by reference to the following example which is provided for illustration only and is not intended to be limiting of the invention unless so stated.

EXAMPLE

The flow characteristics and flow rates of ECO-FOAM™, made by National Starch and Chemical Company, and ENVIROFIL™, made by EnPac, a DuPont-Con Agra Company, both starch-based loosefill products, were compared to the flow characteristics and flow rates of the product of the present invention. The degree of dusting and chipping associated with the ECO-FOAM™ and ENVIROFIL™ products as compared to the product of the invention was also determined.

In doing the study a test rig was constructed which consisted of two bags of approximately 500-cubic feet each. One bag had an 8-inch tee and ducting to draw product out while the other bag was directly connected to 44 feet of louver. The louver had four 4C054 blowers at 11-foot intervals. A 3HP, MH658 was used to convey product from either the duct bag or the louver to either bag. In order to measure the quantity of chips, the products were drained from the bag across a 40-inch×40-inch piece of ½-inch wire cloth.

In making the determinations, a 1-cubic foot sample was weighed on a gram scale to determine approximate density.

Additionally, 14-cubic feet were measured and weighed on a 50 pound capacity electronic bench scale with a 0.01 pound resolution. Approximately 94-cubic feet of starch product were air-conveyed into the test rig "duct bag" via a system to remove any chips from the product prior to testing. The product was then transferred from the "duct bag" to the "louver bag". The transfer time was measured and recorded. The product was then transferred from the "louver bag" to the "duct bag". Again, the transfer time was measured and recorded. In addition, observations were made to the amount and type of dust and chips that were generated. The product was then drained from the system across a chip separation screen. The volume of chips was measured using the 8-inch×8-inch clear box that is used for creep/set tests. The chips were quantified as a percent of product volume. The density of the product of the invention used in this example was 0.54 lb/ft$^3$. The densities determined for the ECO-FOAM™ and ENVIROFIL™ products were 0.6 lb/ft$^3$ and 0.64 lbs/ft$^3$, respectively. The product of the present invention resulted in 0.0097% chips while the ECO-FOAM™ and ENVIROFIL™ resulted in 0.025% and 0.03% respectively. The flow rate of the product of the invention was determined to be 0.62 cubic feet per second while the flow rates for ECO-FOAM™ and ENVIROFIL™ were respectively 0.43 and 0.54 cubic feet per second. The flow rate is dependent upon product size and product density and can therefore be altered accordingly.

The invention now being fully described, it will be apparent to one of ordinary skill in the art that many changes and modifications can be made thereto without departing from the spirit or scope of the appended claims.

What is claimed is:

1. A base mixture for use in producing a resilient, biodegradable packaging material product, said mixture comprising the following first six ingredients plus added water expressed in % by weight of the first six ingredients:

(a) vegetable oil: about 0.5% to about 5%;
   (b) polyvinyl alcohol: about 5% to about 25%;
   (c) glycerine: about 0.5% to about 10%;
   (d) proteinaceous grain meal: about 3% to about 10%;
   (e) glycerol monostearate: about 0.1% to about 0.8%;
   (f) non-modified starch: about 45% to about 90%; and
   (g) added water: about 0% to about 30%.

2. A base mixture for use in producing a resilient, biodegradable packaging material product, said mixture comprising the following first six ingredients plus added water expressed in % by weight of the first six ingredients:

(a) vegetable oil: about 0.5% to about 3%;
   (b) polyvinyl alcohol: about 6% to about 20%;
   (c) glycerine: about 0.5% to about 3%;
   (d) proteinaceous grain meal: about 3% to about 7%;
   (e) glycerol monostearate: about 0.1% to about 0.5%;
   (f) non-modified starch: about 55% to about 88%; and
   (g) added water: about 5% to about 15%.

3. The mixture of claim 2 wherein said vegetable oil content is about 0.9%, said polyvinyl alcohol content is about 18.7%, said glycerine content is about 0.9%, said grain meal content is about 4.7%, said glycerol monostearate content is about 0.2%, said starch content is about 74.6%, and said water is added at an amount of about 6% to about 9%.

4. A biodegradable packaging material product comprising an expanded composition of about 0.5% to about 5% vegetable oil, about 5% to about 25% polyvinyl alcohol, about 0.5% to about 10% glycerine, about 3% to about 10% proteinaceous grain meal, about 0.1% to about 0.8% glycerol monostearate and about 45% to about 70% non-derivatized starch, said product having a moisture content of from about 7.0% to about 12.0% by weight of said composition.

5. The product of claim 4 having a creep of about 10% to about 18%, a set of about 6% to about 16% and a bulk density of from about 0.3 to about 2.0 lb/ft$^3$.

6. The product of claim 5 wherein the creep is about 15%, the set is about 8% and the bulk density is from about 0.4 to about 0.65 lb/ft$^3$.

7. The product of claim 6 wherein the moisture content is from about 10.0% to about 12.0%.

8. A base mixture for use in producing a resilient, biodegradable packaging material product, said mixture comprising the following first six ingredients plus added water expressed in % by weight of the first six ingredients:

(a) vegetable oil: about 0.5% to about 5%;
   (b) polyvinyl alcohol: about 5% to about 25%;
   (c) glycerine: about 0.5% to about 10%;
   (d) proteinaceous grain meal: about 3% to about 10%;
   (e) glycerol monostearate: about 0.1% to about 0.8%;
   (f) non-modified starch with an about 19% to about 44% by weight amylose content: about 45% to about 90%; and
   (g) added water: about 0% to about 30%.

* * * * *

UNITED STATES PATENT AND TRADEMARK OFFICE
CERTIFICATE OF CORRECTION

PATENT NO. : 5,512,090

DATED : April 30, 1996

INVENTOR(S) : FRANKE et al.

It is certified that error appears in the above-indentified patent and that said Letters Patent is hereby corrected as shown below:

On the cover sheet under [56] References Cited, immediately following
"5,279,658   1/1994   Aung................106/154.1", insert
--3,949,145  4/1976   Otey et al............428/423
  4,026,849  5/1977   Bagley et al..........260/17.4
  4,454,268  6/1984   Otey et al............524/47
  4,673,438  6/1987   Wittwer et al.........106/126
  4,900,361  2/1990   Sachetto et al........106/213
  5,095,054  3/1992   Lay et al.............524/47
  5,186,990  2/1993   Starcevich et al......428/35.6

OTHER PUBLICATIONS

Nwufo, B.T., et al., "Extrusion of Starch-Extended Water-Soluble Polyvinyl Alcohol," *Ind. Eng. Chem. Prod. Res. Dev.*, 23:594-595 (1994).

Röper, H., et al., "The Role of Starch in Biodegradable Thermoplastic Materials," *Starch/Starke*, 42(4):123-130 (1990).--

UNITED STATES PATENT AND TRADEMARK OFFICE
CERTIFICATE OF CORRECTION

PATENT NO. : 5,512,090
DATED : April 30, 1996
INVENTOR(S) : FRANKE et al.

It is certified that error appears in the above-indentified patent and that said Letters Patent is hereby corrected as shown below:

Column 3, line 5, delete "0%" and insert therefor --90%--.

Signed and Sealed this

Eighth Day of July, 1997

*Attest:*

BRUCE LEHMAN

*Attesting Officer*     *Commissioner of Patents and Trademarks*